(12) United States Patent
Blanchard

(10) Patent No.: US 6,374,584 B1
(45) Date of Patent: Apr. 23, 2002

(54) REEL TYPE LASER LAWN MOWER

(76) Inventor: Daniel R. Blanchard, 230 County Farm Rd., Jonesborough, Washington County, TN (US) 37659

( * ) Notice: Subject to any disclaimer, the term of this patent is extended or adjusted under 35 U.S.C. 154(b) by 0 days.

(21) Appl. No.: 09/617,557

(22) Filed: Jul. 17, 2000

Related U.S. Application Data

(63) Continuation-in-part of application No. 09/574,364, filed on May 19, 2000, now Pat. No. 6,269,617.

(51) Int. Cl.[7] .............................................. A01D 69/00
(52) U.S. Cl. .................... 56/1; 219/121.74; 219/121.76; 219/121.67
(58) Field of Search .................... 219/121.74, 121.8, 219/121.78, 121.76, 121.67; 372/55–60; 56/1, 16.9, 289; 47/1.3, 1.44

(56) References Cited

U.S. PATENT DOCUMENTS

| | | | |
|---|---|---|---|
| 3,183,650 A | * 5/1965 | Ferris | 56/15.9 |
| 3,652,844 A | 3/1972 | Scott, Jr. | |
| 3,919,806 A | * 11/1975 | Pluenneke et al. | 47/1.3 |
| 4,047,326 A | * 9/1977 | Tibbs | 47/1.3 |
| 4,338,744 A | 7/1982 | Gilmore | |
| 4,952,222 A | 8/1990 | Tobias | |
| 5,305,584 A | * 4/1994 | Hessabi | 56/1 |
| 5,822,966 A | 10/1998 | Snell | |
| 5,896,734 A | 4/1999 | Chesack et al. | |
| 6,032,441 A | 3/2000 | Gust et al. | |
| 6,269,617 B1 | * 5/2000 | Blanchard | 56/1 |

* cited by examiner

Primary Examiner—Robert E. Pezzuto
Assistant Examiner—Árpád Páb Kovacs
(74) Attorney, Agent, or Firm—Pitts & Brittian, P.C.

(57) ABSTRACT

An reel type mower and method for severing vegetation includes at least one laser beam rotating about an axle within a housing so as to be repetitively introduced to vegetation to be severed. At least one laser beam is directed and redirected along multiple, substantially parallel paths, with each path rotating about the axle within the housing of the mower for engagement of the several segments of the laser beam with the vegetation to be severed. The laser beams or individual segments thereof are incorporated into a reel type mower comprising a produced by a laser generator rotating about an axle within the housing for containment of the laser beams. The housing includes a downwardly oriented opening suitable for the receipt therethrough of vegetation to be severed.

15 Claims, 3 Drawing Sheets

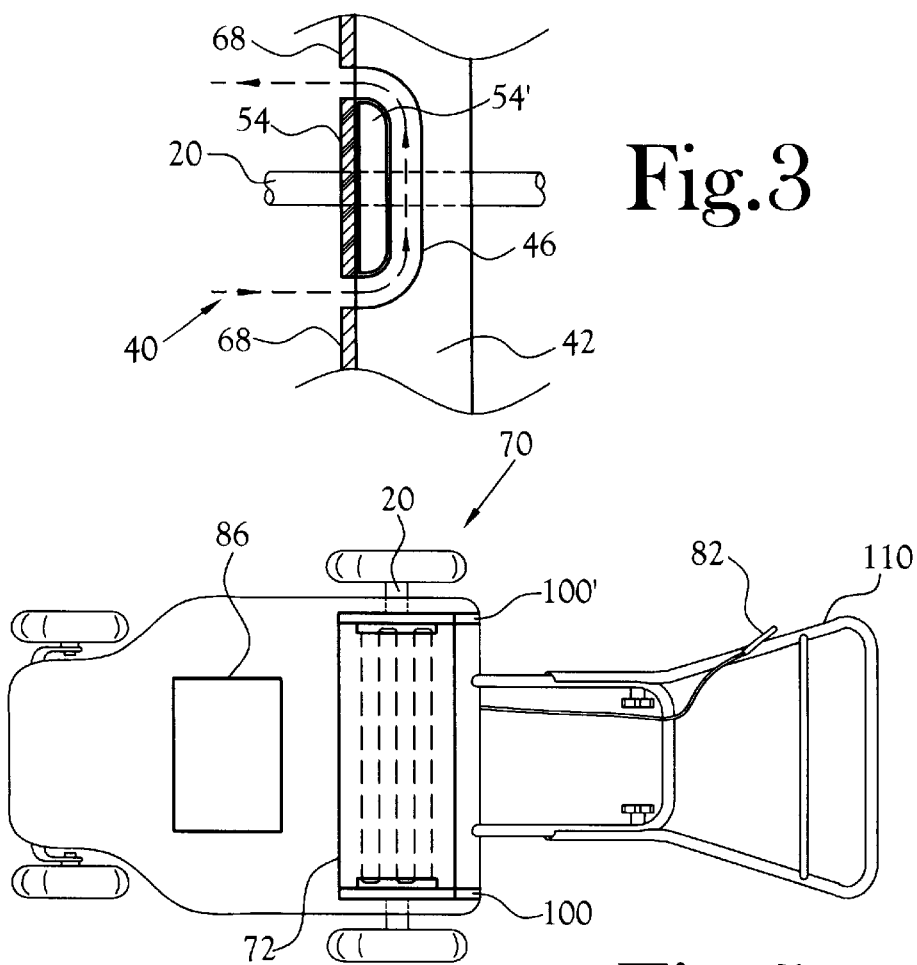
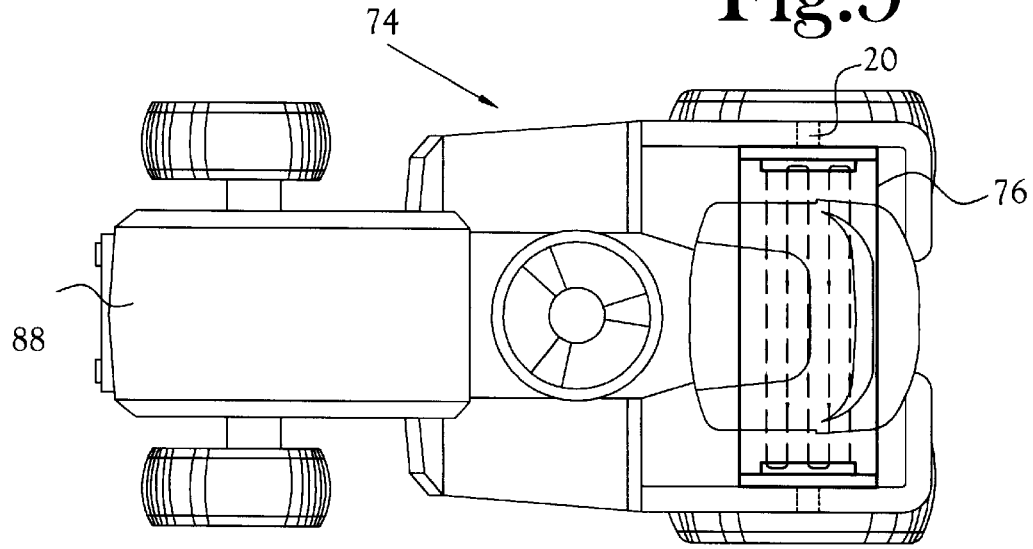

REEL TYPE LASER LAWN MOWER

CROSS-REFERENCE TO RELATED APPLICATIONS

This application is a continuation-in-part of application Ser. No. 09/574,364, filed on May 19, 2000, now U.S. Pat. No. 6,269,617.

BACKGROUND OF INVENTION

1. Field of Invention

The invention relates to an apparatus and method for severing vegetation. More specifically, the invention relates to an apparatus and method for severing vegetation with focused laser beams projected from a reel type mounted mower unit.

2. Description of the Related Art

One type of mowing device including gasoline powered rotary cutting mowers having cutting blades rotated in a horizontal plane and operated by at least one vertical drive spindle, belts and/or drive shafts, and gearing mechanisms. An example of the prior art is U.S. Pat. No. 4,952,222, issued to Tobias, which discloses a grass cutting device with an electrically activated energy path such as strands of wires between spaced electrodes that intersect blades of grass and sears off the grass tips at the contact points. The strands of wires or electrodes are supported by a support means adapted to rest on or in close proximity to the ground. The device also discloses a method of grass cutting including establishing a grass cutting energy path at a location proximate the ground for severing the upper portions of grass blades. The grass cutting energy path can alternatively includes a laser having a laser beam path directed by generally stationary mirrors to extend the laser beam path horizontally within the mower housing between mirrors at a location parallel to the ground. The laser beam may be diminished in intensity and misdirected by reflections off of vibrating mirrors within the mower housing, and may be deflected by the multitude of wet grass blades or reflective objects within the laser beam path as the beam is directed parallel to the ground between mirrors and reflectors.

Another mowing device is a reel type cutting mower that includes a frame within which is mounted a reel rotating about a horizontal axis, with the rotating reel being cylindrical in shape and having a plurality of curved reel blades on the reel. The rotating curved reel blades pass in close proximity to a bed-knife and cutter bar assembly which spans the cutting unit frame parallel to the reel axis. Grass is sheared as it passes between the reel blade and bed-knife/cutter bar assembly. Reel cutting mowers generally provide a more precise cutting of grass, as utilized for golf course maintenance as walk-behind, riding, and towed grass mowers. A drawback of reel cutting mowers includes jamming with moist grass cuttings as the rotating curved reel blades pass in close proximity to the bed-knife or cutter bar assembly. An addition drawback of reel cutting mowers is that the drive connection and adjustable bed-knife/cutter bar assembly require a multitude of mechanicals parts for proper operation, and require adjustments of numerous parts to attain different cutting heights of the reel cutting assembly.

An example of the prior art for reel cutting units is U.S. Pat. No. 5,822,966, issued to Snell, which discloses an adjustable bed-knife and cutter bar for altering the position and angulation of the bar relative to the rotatable reel blades. The cutter bar is adjustable along the arc on the circumference of the rotatable reel for about two different cutting conditions such as a low angle position for low maintenance types of turf, and a high angle position for high maintenance type of turf. The adjustable bed-knife and cutter bar includes a plurality of parts that are hand-adjusted to attain the preferred angle position of the cutter bar.

A further example of the prior art is U.S. Pat. No. 5,896,734, issued to Chesack et al., which discloses a lawn mower having a rotation drive connection assembly providing a reel shaft with curved blades rotating with the reel shaft. The rotation drive connection assembly includes a plurality of mechanical parts which require hand-adjustment to attain the preferred cutting position of the curved blades.

An example of the prior art for riding grass mowers is U.S. Pat. No. 6,032,441, issued to Gust et al., which discloses a triplex trim mower having two reel-type cutting units in the front of the drive unit, and having a rear reel-type cutting unit attached to the drive unit. The mower utilizes reel-type cutting units operated by mechanical connections, and adjusted in position by a positioning means including at least one hydraulic cylinder under operator command.

The prior reel cutting assemblies are typically mechanically or hydraulically adjustable for cutting height. The prior reel cutting assemblies can be operated at a pre-determined speed of rotation, or the speed of rotation of the cutting blades can be adjusted by the operator depending on the need for precise cutting on golf course greens, or less precise cutting on golf course fairways or rough areas.

Commercial mowers would benefit from a reel cutting apparatus that incorporates a cutting means that includes a minimum of parts and that can increase in rotational speed and/or angle of cutting regardless of the ground speed, as controlled by the operator, with no limitation to the rotational speed of the cutting means. By having an easily adjustable rotational speed and/or angle of cutting, the operator may adjust the reel cutting means during mowing operations without stopping the rotation of the reel cutting means to produce smaller sized clippings for effective cutting and mulching of the vegetation.

A need exists in the vegetation control industry for a rotating reel severing apparatus that cuts vegetation at varying speeds during passage of the rotating reel severing apparatus over the vegetation, that does not generate excess noise, and that includes a minimum of moving parts.

Therefore, it is an object of the present invention to provide at least one laser beam projecting between a transmitter and a receiver along a path which contains vegetation to be severed.

It is another object of the present invention to provide a rotating reel severing means for severing vegetation at appropriate heights above the ground with laser light.

It is another object of the present invention to provide an apparatus having a rotating reel severing means rotatable at increasing speeds in proportion to the speed of the apparatus along the surface covered by vegetation.

It is another object of the present invention to provide an apparatus having a rotating reel severing means that includes a minimum of belts, mechanical connectors, and rotating blades.

It is another object of the present invention to provide an apparatus having a rotating reel severing means that does not generate excess noise and minimizes use of moving blades.

It is another object of the present invention to provide a method for severing vegetation with a rotating reel generating means projecting laser light beams during each rotation of the laser generating means.

It is another object of the present invention to provide a method for severing vegetation with a rotating laser generating means operating at high rotational speeds for improved mulching of the cut vegetation.

BRIEF SUMMARY OF INVENTION

A mower for severing vegetation is disclosed with the mower including a reel type laser mower for projecting at least one laser beam between a transmitter and a receiver along a path which contains vegetation to be severed. The reel type laser mower is operable by a user at various ground speeds along a surface covered by vegetation, and includes in one embodiment a rotating laser generating means for projecting and redirecting at least one laser beam along multiple, substantially parallel paths within the mower for severing vegetation contacted by the laser beams. The at least one laser beam is projected between a transmitter and a receiver, and redirected back toward the transmitter within a housing having an opening oriented downwards. The paths of the directed and redirected laser beams are directed horizontally across the opening for contacting and severing vegetation.

A control means is provided to control the speed of rotation of the laser generating means in proportion to the ground speed of the mower. The laser generating means can direct a plurality of laser beams transmitting at different intensities, with each laser beam transmitted across the opening, or, alternatively, angled downwards toward the opening to sever vegetation at different angles during each rotation of the laser beams, thereby creating improved aesthetics for the cut vegetation and improved mulching and decomposition of the vegetation cuttings.

BRIEF DESCRIPTION OF SEVERAL VIEWS OF DRAWINGS

The above-mentioned objects and advantages of the present invention are readily apparent from the description of the invention contained herein, and by reference to the claims, read together with the drawings in which:

FIG. 2a is an end view, in section taken along line 2—2 of FIG. 1, illustrating the laser generating means proximate one support member;

FIG. 2b is an end view of an alternative embodiment of FIG. 2a;

FIG. 3 is a fragmentary enlarged side view illustrating a laser beam channel within the support member of FIG. 2a;

FIG. 5 is a perspective top view of one embodiment of a push mower platform for transporting the rotating reel type laser severing means along a surface covered by vegetation;

FIG. 6 is a perspective top view of an alternative embodiment of a tractor platform for transporting the rotating reel type laser severing means;

DETAILED DESCRIPTION OF THE INVENTION

In accordance with the present invention, there is provided a reel type laser mower for projecting at least one laser beam between a transmitter and a receiver along a path which contains vegetation to be severed, and a method for severing vegetation with the reel type laser mower. The reel type laser mower is operable by a user at various ground speeds along a surface covered by vegetation, and includes a rotating laser generating means for projecting and redirecting laser beams along multiple, substantially parallel paths for severing vegetation by the laser beams.

Figure 1:
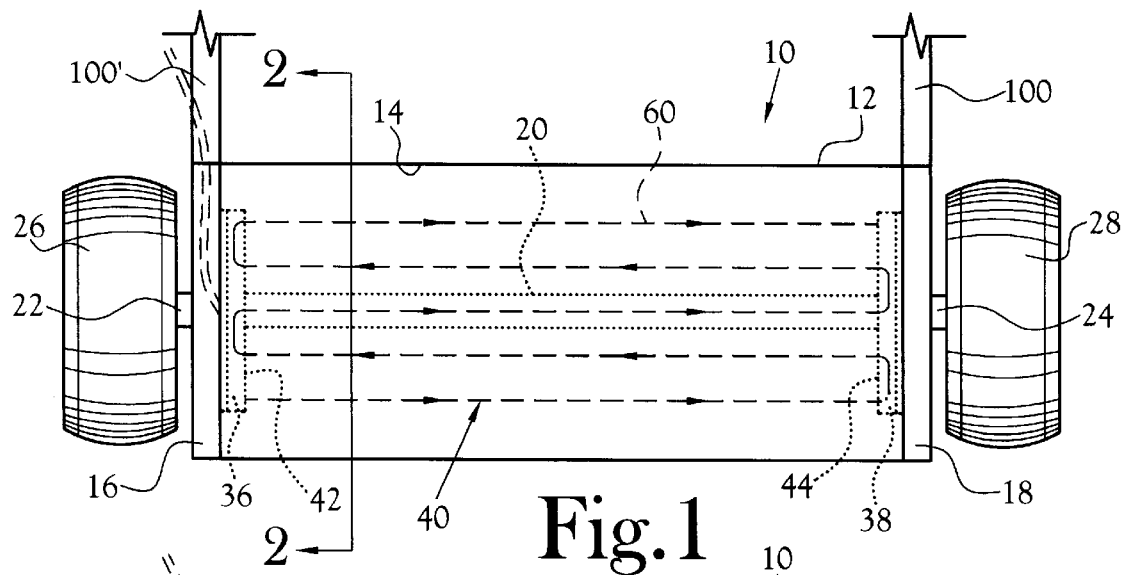
FIG. 1 is a top view of an apparatus for severing vegetation, illustrating a rotating reel type laser generating means projecting at least one laser beam within a housing of the present invention.

One embodiment is illustrated in FIG. 1, for an improved reel type laser cutting mower 10 that includes a housing 12 being generally hemispherical in cross-section and having a length bounded by a first enclosure wall 16 and a second enclosure wall 18. The housing is connected to a transport platform by a plurality of support structures 100, 100' so that the housing is non-rotatable. The housing 12 includes a downwardly oriented opening O into which vegetation extends for severing by a laser beam 40. Interior surfaces 14 of the housing 12 can have light absorbing materials attached thereon for absorbing reflected laser light. The housing 12 encloses an axle 20 that extends horizontally across the interior space of the housing.12. Ends 22, 24 of the axle 20 extends through first enclosure wall 16 and second enclosure wall 18, respectfully, and each respective end 22, 24 can be connectable to a wheel 26, 28 which serves to rotate the axle and as a transport means for movement of the reel type laser cutting mower 10 along the ground level G of a surface having vegetation to be severed.

Rotatably attached proximate either end 22, 24 of the axle 20 is a first support member 36 (see FIGS. 1 and 2), and a similar shaped second support member 38. The first support member 36 and second support member 38 can be shaped as a disc with a perimeter extending outwards generally perpendicular from the axle 20 (see FIG. 2a). In an alternative embodiment, the first 36 and second 38 support members can be shaped as ovals or as a half-circle in circumference (not shown). In any event each support member is attached to, and aligned to rotate in unison upon rotation of the axle 20. The first support member 36 or second support member 38 include thereon at least one laser generating means 54 capable of generating a laser beam 40, with the laser generating means 54 positioned on one of the interiorly facing surfaces 42 and/or 44. Each interiorly facing surface 42, 44 can have laser light reflective material 68 attached (see FIG. 3) for increasing the reflection of laser light beams between the interiorly facing surface 42, 44 as depicted in FIG. 1. The at least one laser generating means 54 is positioned along the perimeter of the interiorly facing surface 42 or 44 (see FIGS. 1 and 2). The laser generating means 54 can include at least one miniaturized laser beam generator 54' powered by electrical energy and having a configuration and operation known to those skilled in the art. Operation of the laser generating means 54 can include the use of at least one pair of opposed channels, or preferably four laser beam channels 46, 48, 50, 52, that are oriented along the perimeter of the interiorly facing surfaces (see FIG. 2a) of the support members 34, 38. Each laser beam channel can separately include at least one laser beam generating means 54 that projects a continuous laser beam 40 from each channel on one interiorly facing surface 42 toward the opposed interiorly facing surface 44, or transmits a series of pulsed laser beams between aligned channels (see FIG. 1), with each laser beam being directed across the space between the interiorly facing surfaces 42, 44, for receiving of each laser beam. Each laser beam channel 46, 48, 50, 52 can include a light reflective channel, or preferably a fiber optic cable (not shown) insertable within the channel, that allows laser light entering a first end of the channel or the fiber optic cable to be transferred through the channel or fiber optic cable for exit from a second end of the channel, thereby being reflected as redirected laser beams 60 in the direction of the opposing interiorly facing surfaces 42 and/or 44 (see FIGS. 1 and 4).

Figure 4:
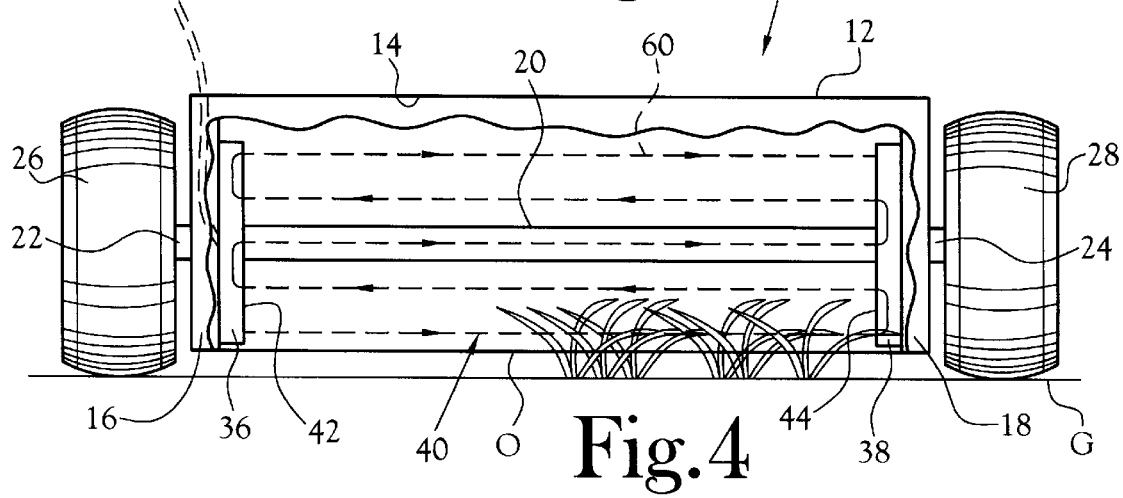
FIG. 4 is a front plan view of FIG. 1, illustrating a downward oriented opening into which vegetation protrudes during movement of the mower, with at least one laser beam projected across the width of the opening.
Figures 2A, 2B:
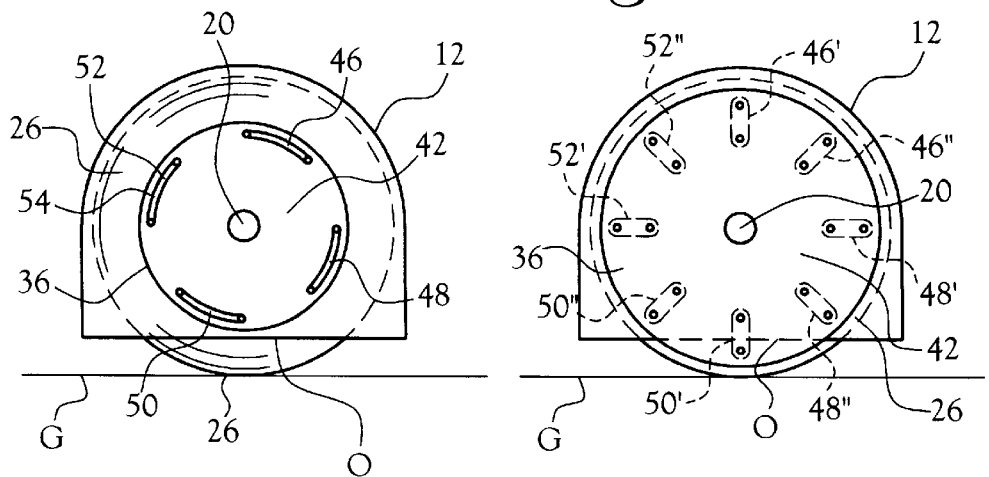
Figure 8:
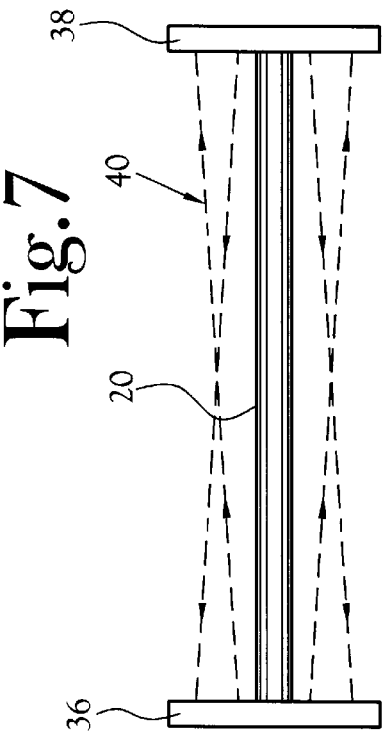
FIG. 8 is a fragmentary representation of FIG. 4 of one embodiment of laser beams that are oriented non-horizontally with the ground level.

The at least one laser generating means 54 can include alternative embodiments, including an alternative embodiment having at least two opposed laser beam transmitters (not shown), one located on the first interior surface 42 at one perimeter position, and the second laser beam transmitter being located at a nonaligned position about 90° or at about 180° along the perimeter of the second interior surface 44. The opposed laser beam transmitters, although not aligned in positioning, allow for severing of vegetation at least twice during each rotation of the laser beams projected between interiorly facing surfaces 42 and 44 which are rotated in unison by being joined by the axle 20. An additional alternative embodiment can include a plurality of channels aligned radially from the central portion of the first interior surface 42, as illustrated in FIG. 2b, or alternatively aligned radially on the second interior surface 44. FIG. 4 illustrates the front view of the laser cutting mower 10 having a downward oriented opening O into which vegetation protrudes during movement of the mower across the vegetation covered surface, with at least one laser beam 40 projecting either horizontally (see FIG. 4), or angled (see FIG. 8) across the width of the opening O, thereby severing vegetation which is contacted by the laser beam or beams as the mower is moved along the ground level G.

A preferred embodiment includes four opposed laser beam emitters, with each opposed laser beams aligned with an appropriate laser beam channel 46, 48, 50, 52. Each laser beam generated can be transmitted at the same intensity, or at different intensities while being directed across the space between the interiorly facing surfaces 42, 44. For any of the embodiments, the laser beams can be rotated while the interiorly facing surfaces 42, 44 are separated by a width of about eighteen inches of separation, or while being separated by a width of about twenty-two inches of separation. By providing a plurality of opposed laser beams being rotated in unison, the reel type laser cutting mower 10 severs the ends of vegetation such as grass, weeds, or other vegetation extended into the opening O, at consistent heights no matter the ground speed of the housing 12, 72, 76, or platform 92 (see FIGS. 1, 4, 5 and 6), which improves the aesthetics of the cut vegetation while encouraging the mulching and decomposition of the vegetation cuttings.

A beneficial feature of the improved reel type laser cutting mower 10 is that speed of rotation and the intensity of the at least one or more laser beams is not limited to a certain constant rotation speed during each rotation. The speed of rotation of the first support member 36 and second support member 38 and interiorly facing surfaces 42, 44 in concert with the axle 20, allows the horizontally transmitted laser beam 40 and reflected laser beam(s) 60 to be increased in intensity and in frequency of rotation in direct proportion to the ground speed of the housing 12, 72, 76, or platform 92 (see FIGS. 1, 4, 5, 6, and 7), and transport means 70, 74, or 78. Rotational speeds for the at least one laser generating means 54 is limited only by the physical limits of rotation of the support members and axle 20 and related mechanical parts of the reel type laser cutting mower 10. Therefore, as the ground speed is accelerated of the push mower transport means 70, or the lawn and garden tractor 74, or the tractor 78 pulling a ganged 80 reel type laser generating means, then the rotational speed and the intensity of each laser beam can be increased to ensure that the blades of vegetation contacted by the laser beams are cut consistently at appropriate heights determined by the horizontally guided laser beams 40, 60. The prior grass mowing devices have speed limitations imposed by industry safety standards on the engine and/or blade rotation mechanism to limit blade tip speeds as a function of the length of the mower blade as a safety measure. The severing height of each rotating laser beam can be adjusted by the operator so that different severing heights are attainable by adjusting the angular direction of each of the plurality of laser beams 40, 60 generated by the laser generating means 54.

For laser beams that are misdirected by rocks or other reflective non-vegetative objects, the errant laser beams either harmlessly strike the ground or are contained within the housing 12 regardless of the rotational speed of the laser beams(s), with the scattered laser beams being absorbed by the laser beam absorbing materials 14. One of many advantages of the reel type laser cutting mower 10 is that when the ground speed of the transport means 70, 74, or 78 is accelerated, the rotational speed and/or the intensity of each horizontally transmitted laser beam 40, and reflected laser beam 60, is increased in proportion to ensure that all of the vegetation contacted by the laser beams is cut at appropriate heights across a width of the severing path no matter the ground speed of housing 12.

A system control means 82 is positioned proximate the housing 12, on user operated control arms 110 (see FIG. 5). The intensity and frequency of the laser beam 40 generated by the generating means 54 is controlled by electronic circuitry within, and/or connectable to, the system control means 82 which can include sensor means (not shown) for measuring ground speed of the transport means 70, 74, or 78. The user is able to manipulate the system control means 82 to adjust the speed of rotation of the interiorly facing surfaces 42, 44 and/or the at least one laser beam 40 generated as the reel type laser cutting mower 10 is transported across the vegetation to be cut. The system control means 82 can include a ground speed indicator (not shown) and electrical circuitry that is known to those skilled in the art to adjust the speed of rotation of the laser beams in proportion to changes in the ground speed of the reel type laser cutting mower 10. A plurality of laser beams can be generated simultaneously by a plurality of laser beam generators located along the perimeter and/or mid-circumference of the rotating interiorly facing surfaces 42, 44. A user manipulated control means 82 for controlling the intensity of the laser beams generated, and for controlling the speed of rotation of the interiorly facing surfaces 42, 44, can be positioned on the transport means 70 and in reach of the user.

Electrical power can be provided to the laser beam 40 generating means 54 by an electrical power means 84 (FIG. 7) being detachably connected to the housing 12, with the electrical power means being a plurality of rechargeable batteries, and/or an electrical generator (not shown) powered by a power generating means 86, 88, 90 that can provide power to drive the wheels of the transport means 70, 74 or 78 (see FIGS. 4, 5 and 6). The electrical generator provides electrical power of about 110 volts to operate the laser beam 40 generating means 54. For the plurality of batteries that are utilized to power the laser generating means 54, the batteries may be rechargeable batteries known to those skilled in the art.

Figure 7:
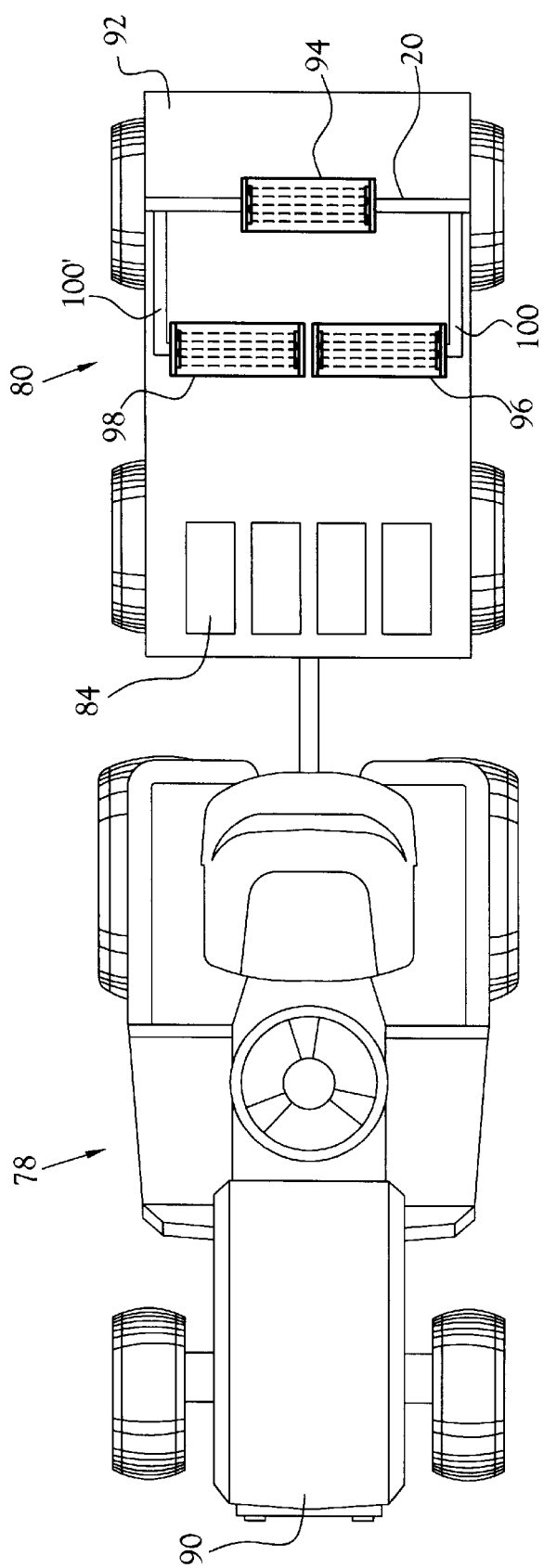
FIG. 7 is a perspective top view of an alternative embodiment of a gang of rotating reel type laser severing means of the present invention pulled by a tractor.

The transport means can include a walk-behind, push mower configuration 70 (see FIG. 5), a residential lawn and garden mowing tractor 74 (see FIG. 6), or a commercial sized tractor 78 pulling a platform 92 supporting a ganged 80 group of reel type laser generating means 94, 96, 98 (see FIG. 7). An additional alternative embodiment can include a portable, individual user-worn support harness connectable to an elongated support frame, and/or backpack harness for attachment to a light-weight, portable housing having a laser beam generating means connected to the elongated support frame. One or more housings 94, 96, 98 (see FIG. 7) can be mounted at the front, underneath, or the rear of the mowing tractor 78, with each housing including a reel type laser generating means centrally positioned in each housing. Variable severing widths can be provided by adding different combinations of eighteen inch and twenty-two inch widths of reel type laser generating means, for example, to provide either an eighteen inch cutting path or a twenty-two inch cutting path for walk-behind mowers 70. For riding units 74, 78, two eighteen inch diameter housings can be combined side-by-side, or three or more housings can be combined side-by-side or staggered to provide between about a thirty-six inch cutting path, to about a sixty-three inch or wider cutting path (see FIG. 7).

The control means 82 can include controls having a plurality of electrical and mechanical interfaces positioned proximate to the user operating position for each alternative embodiment. The electrical and mechanical interfaces provide user control of the rotation speed and angular direction of each laser generating means 54, provide user control of the intensity of the laser beams, and can provide the user a visual indication of the ground speed and rotational speeds of the circulating laser beams. Electrical circuitry known to those skilled in the art can automatically increase the speed of rotation of the laser beam generating means as the ground speed of the transport means increases to increase the rotation of the laser beams in proportion to the speed of travel across the surface covered by vegetation.

The constantly circulating reel type laser beams can be separately controlled by the electrical and mechanical interfaces to allow user adjustments for landscape changes as the transport means 78 (see FIG. 7), housing(s) 94, 96, 98 move along the surface covered by vegetation, thereby creating precisely cut clippings that can be of variable length if angled laser beams (see FIG. 8) are utilized, thereby providing improved aesthetics for the cut vegetation and improved mulching and decomposition of the cuttings. The laser generating means 54 of the reel type laser cutting mower 10 operates with reduced noise due to the absence of rotating severing blades, and the potential to utilize a plurality of batteries for a power source. Additionally, the reel type laser cutting mower 10 operates with a reduced number of moving mechanical parts thereby reducing maintenance requirements imposed on the user.

A number of associated electronic and mechanical components known to those skilled in the art are not illustrated, but can be incorporated without interfering with the objects and advantages of the present invention. A electrical generator (not shown) can be sized appropriately to provide sufficient power to operate a plurality of laser beam generating means 54 in separate housings 94, 96, 98, each having a plurality of laser beams projected horizontally between interiorly facing surfaces 42, 44 within each housing 94, 96, 98.

A method for severing vegetation is disclosed, the method providing a reel type laser severing system for severing vegetation along a surface covered by vegetation. The method includes the step of providing a laser severing system having at least one laser beam generator being electrically powered and being positioned within an enclosure for containing errant laser beams and projecting at least one laser severing beam 40 horizontally between interiorly facing surfaces 42, 44 of the enclosure while maintaining the laser severing beam 40 parallel to and proximate the surface covered by vegetation. Alternatively, the method includes redirecting the laser beam along reflected paths between the interiorly facing surfaces 42, 44 of the enclosure, while the laser paths are positioned for engagement of the laser beams with vegetation to be severed.

Further, alternatively, the method may include the steps of rotating the laser beam around an axis substantially parallel to the vegetation covered surface, and/or the step increasing the rotating speeds of the laser beams proportionally in response to changes in ground surface speeds of the reel type laser mower 10.

The method may further include transporting the rotating laser beam enclosed in a supporting, non-rotating, enclosure attached to a movable mower platform and along the vegetation covered surface at varying speeds. Controlling the rotational speed of the at least one rotating laser severing beam 40 as the reel type laser mower 10 is transported across the surface covered by vegetation during severing of the vegetation may also be provided.

Adequate electrical power is provided to the laser severing system to rotate a plurality of laser beam generators, including up to about four laser beam generators rotating in synchronization. Each laser beam projected across the opening of the enclosure can be angled at angles other than horizontal, thereby providing for multiple height cuttings of vegetation by the laser beams during each rotation of the laser beams. The electrical power to operate each of the laser beam generators can be provided by batteries and/or an electrical generator attachable to the transport platform.

From the foregoing description, advantages will be recognized by those skilled in the art for the rotatable laser severing apparatus and method for severing vegetation of the present invention. One advantage is that the plurality of rotating laser beams provide multiple severing path lengths, such as eighteen inch, twenty-two inch, and larger severing path lengths, along with multiple underneath, side-by-side and/or side oriented housings attachable to a transport platform. Another advantage is that the plurality of rotating laser beams can be separately angled downward at angles other than horizontal thereby providing the plurality of laser beams with multiple severing paths having different heights and widths across the vegetation during each rotation of the plurality of laser beams. The multiple severing paths, variable severing heights and variable widths of the plurality of rotating laser beams provide improved aesthetics for the remaining cut vegetation on surfaces traversed by the laser severing system, and provides improved mulching and decomposition of the cuttings due to the multiple lengths of the severed vegetation.

While a preferred embodiment is shown and described, it will be understood that it is not intended to limit the disclosure, but rather it is intended to cover all modifications and alternate methods falling within the spirit and the scope of the invention as defined in the appended claims. One skilled in the art will recognize variations and associated alternative embodiments. The foregoing description should not be limited to the description of the embodiment of the invention contained herein.

What is claimed is:

1. A reel type mower for severing vegetation as said mower is controlled by a user, comprising:

an elongated housing having opposite end walls and having an opening defined along the length of said elongated housing, said opening in position to admit vegetation through said opening, said vegetation being in position to be engaged by a laser beam, said housing having a guide handle attached thereto;

an axle positioned along the length of said elongated housing within said housing, said axle rotatable along its axis between a first end and a second end of said axle, said first end and said second end positioned respective to said opposite end walls, said first end and said second end being rotatably supported between said end walls;

a first support member connected to said first end of said axle at a location inside said housing, said first support member being rotatable with said axle and having an interior surface;

a second support member connected to said second end of said axle at a location inside said housing, said second support member being rotatable with said axle and having an interior surface;

at least one laser generator means positioned on and rotatable with said interior surface of said first support member and said axle; and at least one laser beam generated by said at least one laser generator means and rotatable with said axle, said laser beam being directed along a path extending between said first and second support member and which is disposed proximate to said opening and in position to contact vegetation to be severed, the vegetation entering said housing through said opening.

2. The mower of claim 1, wherein said laser beam is redirected along multiple, substantially parallel separated paths between said interior surfaces of said first and said second support members, said parallel separated paths being consecutively directed between said interior surfaces of said first and second support members, said parallel separated paths of said laser beam proximate said opening as said at least one laser generator means is rotatable with said axle and said laser beam is in position to sever vegetation entering said housing through said opening.

3. The mower of claim 2, further including power means proximate said housing for providing power to said at least one laser generator means; and a pair of wheels respectively connectable to said first and said second ends of said axle, said wheels being positionable outwardly of said first and said second ends of said axle extended through a first enclosure wall and a second enclosure wall, said wheels rotatable with said axle when said mower is moved along a supporting surface.

4. The mower of claims 3, further including:

a second laser generator positioned on said interior surface of said second support member and directing a second laser beam between said interior surfaces of said first and said second support members.

5. The mower of claim 4, including system control means positioned proximate said housing for controlling the intensity of said at least one laser beam, said system control means to said guide handle attached to said housing.

6. The mower of claim 5, including a transport means connectable to said housing, said transport means being movable along a supporting surface at a variable ground speed.

7. The mower of claim 6, wherein said housing includes an interior surface having a light absorbing material positioned thereon, whereby said light absorbing material absorbs errant laser light from said at least one laser beam.

8. The mower of claim 7, wherein said at least one laser beam is rotatable with said axle at a speed of rotation which is proportional to the transport speed of said transport means.

9. The mower of claim 8, including a plurality of laser beam generators generating a plurality of laser beams which are, said plurality of laser beams projected along multiple, substantially parallel paths between said interior surfaces of said first and second support members.

10. The mower of claim 9, wherein the parallel paths of said laser beams are adjustable in angular direction at angles other than horizontal to the supporting surface along which said mover traverses.

11. A reel type mower for severing vegetation comprising:

a housing generally hemispherical in cross-section, said housing having a first end wall and a second end wall extended generally perpendicular and downwardly from said housing, said housing defining an opening bounded at opposite ends thereof by said first end wall and said second end wall, said opening being oriented downwardly and positionable proximate a surface covered by vegetation;

an axle rotatably mounted within and relative to said housing, said axle extending between said first end wall and said second end wall of said housing and having a first end insertable centrally through said first end wall, and having a second end insertable centrally through said second end wall, said axle rotatable along its axis between said first end said second end of said axle;

a first support member fixedly mounted on said axle and proximate said first end of said axle, said first support member being positioned inwardly of said first end wall and having an interior surface facing inwardly of said housing;

a second support member fixedly mounted on said axle and proximate said second end of said axle, said second support member being positioned inwardly of said second end wall and having an interior surface facing inwardly of said housing;

whereby said first support member and said second support member rotate in unison when said axle rotates;

a laser generator positioned on said interior surface of said at least one of said first and said second support members;

at least one laser beam generated by said laser generator and directed along a path that extends between said first and second support members; said at least one laser beam being rotatable with said support members during operation of said reel type mower and being positioned proximate to said opening to sever vegetation extended into said opening; and power generating means for providing electrical power to said laser generator, said power generating means controlled by a system control means controlled by a user.

12. The reel type mower of claim 11, wherein the speed of rotation of said at least one laser beam is variable and increased by said system control means controlled by the user as a function of the ground speed of the mower along a supporting surface.

13. The reel type mower of claim 12, including a plurality of laser beams projected along multiple substantially parallel paths between said first and said second support members, said paths being consecutively movable into position for engagement of said laser beams with vegetation to be severed, by rotation of said axis, said first support member and said second support member in unison when said axle rotates.

14. A method for severing vegetation, employing a reel type rotating laser system movable across a vegetation bearing surface, said method comprising the steps of:

projecting a laser beam parallel to a rotatable axle between a transmitter and a receiver positioned at opposed ends of said rotatable axle, said step of projecting a laser beam including moving said transmitter and said receiver in concert with said rotatable axle, thereby projecting said laser beam along a plurality of paths which contain vegetation to be severed;

directing said laser beam along multiple, substantially parallel spaced apart paths, said paths being movable consecutively into positions for engagement of said laser beam with the vegetation to be severed, by rotating said rotatable axle having a first support member and a second support member in unison when said rotatable axle rotates, said first support member having said transmitter thereon, and said second support member having said receiver thereon;

rotating said laser beam around an axis of said rotatable axle substantially parallel to the vegetation covered surface; and enclosing said laser beam within a housing having a downwardly oriented opening, said housing positioned between a pair of rotatable wheels connectable on opposed ends of said rotatable axle, said rotation of said laser beam is variable and increased by a system control means controlled by the user as a function of the ground speed of the mower along the vegetation bearing surface, said downwardly oriented opening positionable proximate the vegetation bearing surface to receive vegetation extending into said opening for severing by said laser beam.

15. The method of claim 14, and including the step of directing said laser beam along said multiple, substantially parallel spaced apart paths which are substantially horizontal to the vegetation bearing surface, thereby providing a plurality of severing paths of different heights as said rotatable axle and said substantially parallel spaced apart paths rotate for said laser beam during rotating of said laser beam.

* * * * *